(12) United States Patent
Hammerschmidt et al.

(10) Patent No.: US 11,409,741 B2
(45) Date of Patent: Aug. 9, 2022

(54) ENABLING DATA FORMAT SPECIFIC DATABASE FUNCTIONALITIES OVER EXISTING DATA TYPES BY MARKING OPERAND VALUES

(71) Applicant: Oracle International Corporation, Redwood Shores, CA (US)

(72) Inventors: Beda Christoph Hammerschmidt, Los Gatos, CA (US); Zhen Hua Liu, San Mateo, CA (US); Vikas Arora, San Francisco, CA (US); Prakashkumar Thiagarajan, San Jose, CA (US); Douglas James McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 15/993,438

(22) Filed: May 30, 2018

(65) Prior Publication Data

US 2019/0370373 A1 Dec. 5, 2019
US 2020/0117736 A9 Apr. 16, 2020

Related U.S. Application Data

(60) Provisional application No. 62/566,365, filed on Sep. 30, 2017.

(51) Int. Cl.
*G06F 16/00* (2019.01)
*G06F 16/2453* (2019.01)
*G06F 16/22* (2019.01)
*G06F 16/80* (2019.01)
*G06F 16/25* (2019.01)

(52) U.S. Cl.
CPC ...... *G06F 16/24542* (2019.01); *G06F 16/221* (2019.01); *G06F 16/25* (2019.01); *G06F 16/80* (2019.01)

(58) Field of Classification Search
CPC .. G06F 16/24542; G06F 16/221; G06F 16/80; G06F 16/25; G06F 16/24524
See application file for complete search history.

(56) References Cited

U.S. PATENT DOCUMENTS 6,507,846 B1   1/2003   Consens
7,516,121 B2   4/2009   Liu et al.
(Continued)

FOREIGN PATENT DOCUMENTS

WO    WO 03/107222 A1    12/2003
WO    WO 2008/091705 A2   7/2008
(Continued)

OTHER PUBLICATIONS

Hammerschmidt, Beda, "JSON Generation: to quote or not to quote, that is the question, JSON in the Oracle Database", Blogs. Oracle, dated Aug. 8, 2017, 6 pages.
(Continued)

*Primary Examiner* — Neveen Abel Jalil
*Assistant Examiner* — Paul Kim
(74) *Attorney, Agent, or Firm* — Hickman Becker Bingham Ledesma LLP

(57) ABSTRACT

Functionalities of new data types are enabled for data stored using native data types ("recognized data types") supported by DBMSs. Values having a latent data type may be stored using a recognized data type of a DBMS. That is, a value stored in a database table may be recognized by a DBMS as having a recognized data type (e.g., character string) but the value may also include information that indicates the value conforms to a particular latent data type. DBMSs compile database statements. The database statement can contain multiple expressions that may specify a latent data type or that may have a recognized data type but that also imply latent data types. By determining that various expressions
(Continued)

have latent data types, operations that rely on the expressions as having a latent data type may be validated in a query and executed accordingly.

20 Claims, 6 Drawing Sheets

(56) References Cited

U.S. PATENT DOCUMENTS

| | | | |
|---|---|---|---|
| 7,836,066 | B2 | 11/2010 | Chang et al. |
| 7,913,241 | B2 | 3/2011 | Liu et al. |
| 2005/0055355 | A1 | 3/2005 | Murthy et al. |
| 2006/0047719 | A1 | 3/2006 | Hershkovich |
| 2007/0250517 | A1* | 10/2007 | Bestgen ............... G06F 16/22 |
| 2008/0189303 | A1 | 8/2008 | Bush et al. |
| 2008/0320019 | A1 | 12/2008 | Bireley |
| 2013/0159278 | A1 | 6/2013 | Liu et al. |
| 2015/0039587 | A1 | 2/2015 | Liu et al. |
| 2015/0058337 | A1* | 2/2015 | Gordon ............... G06N 7/005 |
| | | | 707/736 |
| 2017/0017683 | A1 | 1/2017 | Fourny et al. |
| 2017/0060973 | A1 | 3/2017 | Liu et al. |
| 2020/0210398 | A1 | 7/2020 | Liu |

FOREIGN PATENT DOCUMENTS

| | | |
|---|---|---|
| WO | WO2015/017724 A1 | 2/2015 |
| WO | WO2015/069941 A1 | 5/2015 |
| WO | WO 2015/069941 A1 | 5/2015 |

OTHER PUBLICATIONS

Liu, U.S. Appl. No. 14/337,189, filed Jul. 21, 2014, Office Action, dated Dec. 28, 2018.

Mostarda et al., "MU: An Hybrid Language for Web Mashups", International World Wide Web Conference, Madrid, Spain, dated 2009, 10 pages.

Liu et al., "A Decade of XML Data Management: An Industrial Experience Report from Oracle", IEEE, dated 2009, 12 pages.

Bamford, Roger et al., "Xquery Reloaded", Proceedings of the VLDB Endowment 2.2 dated 2009, pp. 1342-1353.

McHugh et al., "Lore: A Database Management System for Semistructured Data", SIGMOD, vol. 26 No. 3, dated Sep. 3, 1997, 14 pages.

Shukla et al., "Schema-Agnostic Indexing with Azure DocumentDB", Proceedings of the VLDB Endowment, vol. 8, No. 12, Copyright 2015 VLDB, 12 pages.

Oracle Database, "Introduction to Simple Oracle Document Access (SODA)", 18c E86033-04, dated Aug. 2018, 96 pages.

Li et al., "Closing the functional and Performance Gap between SQL and NoSQL", ACM 978-1-4503-3531-7, dated Jun. 26, 2016, 12 pages.

Kleppmann et al., "A Conflict-Free Replicated JSON Datatype", dated Aug. 15, 2017, 17 pages.

Chasseur et al., "Enabling JSON Document Stores in Relational Systems", WebDB dated 2013, New York, New York, USA, 16 pages.

Liu, U.S. Appl. No. 16/690,817, filed Nov. 21, 2019, Office Action, dated Feb. 4, 2021.

Liu, U.S. Appl. No. 16/690,817, filed Nov. 21, 2019, Interview Summary, dated Jun. 16, 2021.

Liu, U.S. Appl. No. 16/690,817, filed Nov. 21, 2019, Final Office Action, dated Jun. 16, 2021.

Liu, U.S. Appl. No. 16/690,817, filed Nov. 21, 2019, Advisory Action, dated Jul. 28, 2021.

Liu, U.S. Appl. No. 16/690,817, filed Nov. 21, 2019, Notice of Allowance and Fees Due, dated Aug. 23, 2021.

Liu, U.S. Appl. No. 16/690,817, filed Nov. 21, 2019, Notice of Allowability, dated Sep. 15, 2021.

* cited by examiner

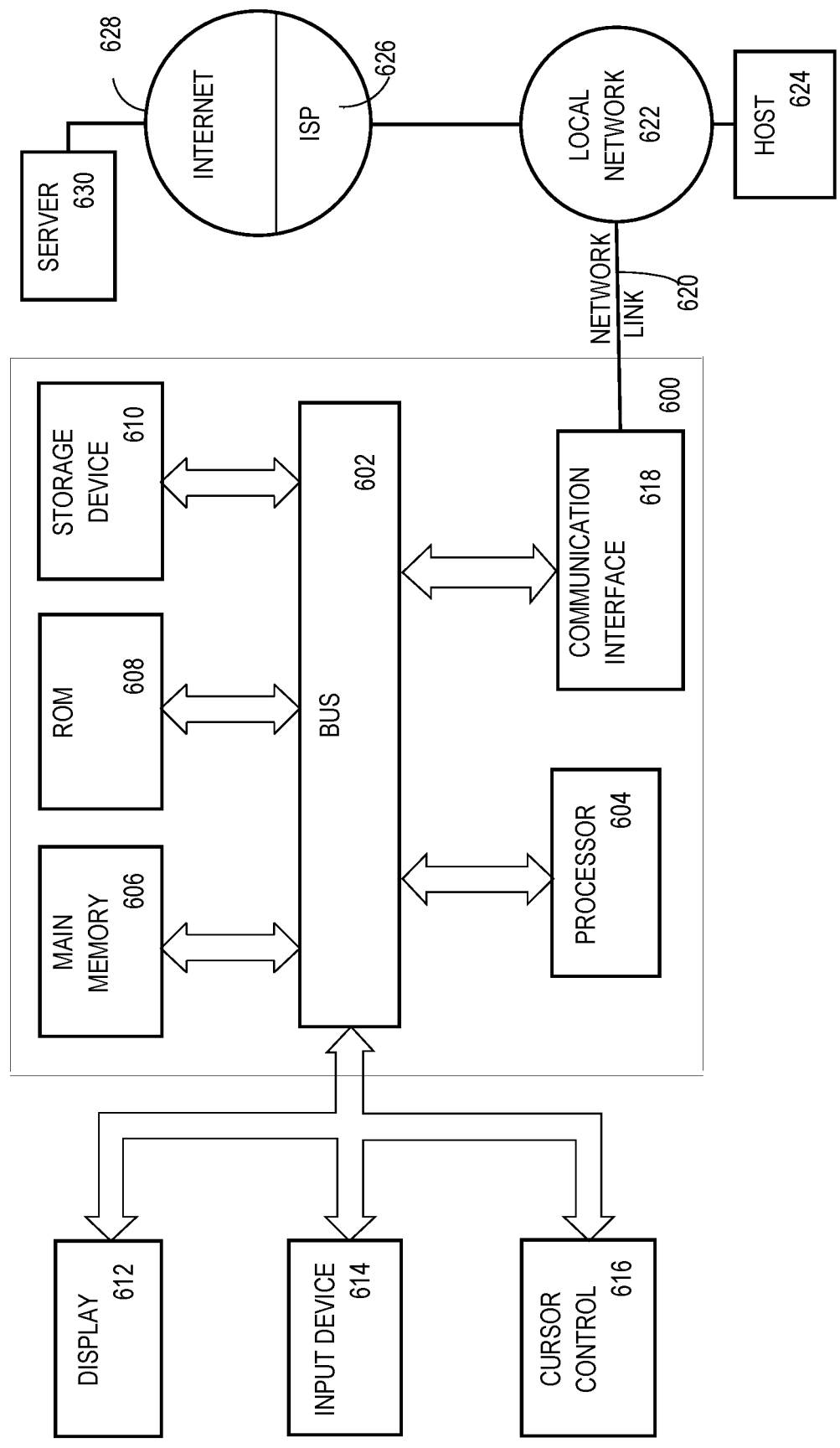

ENABLING DATA FORMAT SPECIFIC DATABASE FUNCTIONALITIES OVER EXISTING DATA TYPES BY MARKING OPERAND VALUES

CROSS-REFERENCE TO RELATED APPLICATIONS; PRIORITY CLAIM

This application claims the benefit of Provisional Appln. No. 62/566,365, filed Sep. 30, 2017 and titled "Enabling Data Format Specific Database Functionalities Over Existing Data Types By Marking Operand Values", the entire contents of which is hereby incorporated by reference as if fully set forth herein, under 35 U.S.C. § 119(e).

FIELD OF THE DISCLOSURE

This disclosure relates to identifying data types in database statements and processing the database statements according to the data types.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database management systems (DBMS) use a multitude of data types, such as "character string," "number," "Boolean," and "timestamp," to store and process data. Certain commands and operations expect and yield a given data type. For example, a "sum" operation expects number inputs and returns a number output. As another example, the "IN_STRING" operation expects a character string input and returns a Boolean output.

There exist a variety of data formats, which include Extensible Markup Language (XML), JavaScript Object Notation (JSON), and HyperText Markup Language (HTML). In order to store data from one of these or other data formats in DBMS, a suitable data type must be selected for the data. This is because DBMS only understands data that is of a suitable data type and cannot perform operations on data in an unrecognized format.

One option to support a new data format is to add a dedicated data type, for example, "XMLType." However, adding a new dedicated data type each time a new semi-structured data format is introduced is expensive from both a standards adoption and an DBMS implementation perspective. Standards organizations can take years to agree on and promulgate standards for a new data type.

For a DBMS, each data type must be supported for all database functionalities, such as import/export, partitioning, and replication. This requires vast code changes and testing. Besides these implementation issues, creating a new dedicated data type also restricts the ability to select between data types based on preference. Furthermore, many DBMS clients (e.g., JDBC, ODP, and database import/export functions) may require modification to provide client operability with each new data format-specific data type and set of operators added.

Thus, a solution for effectively using data having a new data format without creating a dedicated data type is needed.

BRIEF DESCRIPTION OF THE DRAWINGS

In the drawings:

FIG. 6 depicts a computer system upon which an embodiment may be implemented.

DETAILED DESCRIPTION

Figure 1A:
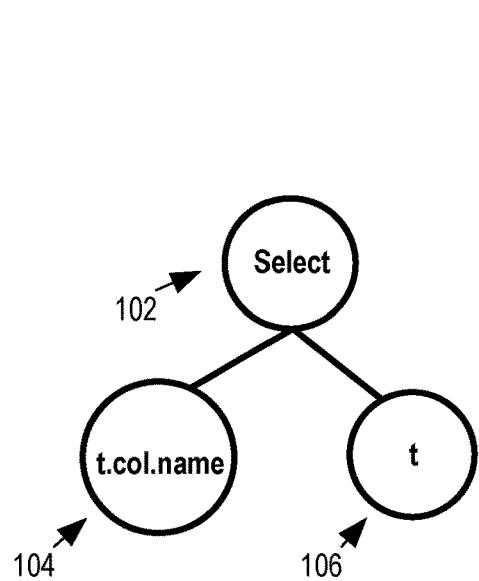
FIG. 1A illustrate operator trees that correspond to database statements, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for enabling functionalities of new data types for data stored using native data types ("recognized data types") supported by DBMSs. Examples of recognized data types are various string types (e.g., VARCHAR) and large object (LOB) data types including character large object (CLOB) and binary large object (BLOB). A data type or format not defined by a database dictionary of a database management system (DBMS) or an American National Standards Institute (ANSI) standard database language may be referred to herein as a "latent data type." Values having a latent data type may be stored using a recognized data type of a DBMS. That is, a value stored in a database table may be recognized by a DBMS as having a recognized data type (e.g., character string) but the value may also include information that indicates the value conforms to a particular latent data type.

DBMSs compile database statements. A database statement may be, for example, a database statement received for execution in a database session or a database statement received to define a view. The database statement can contain multiple expressions that may specify a latent data type or that may have a recognized data type but that also imply latent data types. Expressions may be for example:

(1) A reference to a column in a SELECT clause or predicate, the column being defined by a DBMS as having a VARCHAR or BLOB datatype. A latent data type may be implied by a constraint on the column constraining the column to JSON, or by the column being referenced as an operand in a function, wherein the function expects the operand to have the JSON data type.

(2) A reference to a function for which the DBMS is configured to return a latent data type, such as JSON.

In an embodiment, a latent data type may be communicated using a DBMS client Application Programming Interface (API), such as Oracle Call Interface (OCI), Java Database Connectivity (JDBC), and Open Database Connectivity (ODBC).

By determining that various expressions have latent data types, operations that rely on the expressions as having a latent data type may be validated in a query and executed accordingly. For illustrative purposes, the JSON format may be used herein as an example of a latent data type. However, the techniques described herein may apply to a variety of data formats or languages. Various scenarios in which determining that one or more expressions in a database statement return latent data types are described below.

Illustrative Methods of Specifying Latent Data Types

A database table or table column referenced by a query can be identified as storing data of a particular latent data type by detecting use of a check constraint. A check constraint is part of a table definition in a database dictionary and defines requirements for values to be stored in column. A check constraint is different than the data type declared for a column. The table definition is referred to by a DBMS when the DBMS is compiling the query.

For example, to be stored in a column "col", a value may be required to be in JSON format. The table definition for the column defines column "col" as a LOB data type and defines the "IS_JSON" constraint for the column to ensure that any data added to the column conforms to the JSON format.

When compiling the query, the check constraint "IS_JSON" is detected and the column is treated as having the JSON latent data type during further compilation of the query and subsequent execution of the query. The query is compiled in such a way that when values are retrieved from the column, operations that are based on the latent data type respond consistently with the latent data type.

For example, column "col" in a table "t" is used to store JSON, a data type that a DBMS does not recognize for a column. To store JSON data in table "t" in a DBMS, a recognized data type is selected for column "col", such as character string. The following Database Statement 1 below references table "t" using notation recognized for JSON but not valid for the character string data type. Without the ability to recognize the latent data type and treat it as such, executing Database Statement 1 may result in an error for an invalid identifier.

SQL>select t.col.name from t; Database Statement 1

The column "col" in Database Statement 1 is defined to have a check constraint that ensures that data in "col" is in JSON format. A DBMS detects the check constraint, thereby determining that "col" has the JSON data type. By determining that column "col" has the latent data type JSON, a DBMS may treat the column in accordance with rules specific to JSON rather than the data type defined for the column by the database dictionary of the DBMS.

Part of compiling Database Statement 1 to treat "col" as JSON may involve rewriting the statement to annotate "col" as having the latent data type JSON. A language or other data construct is used to annotate the latent data type; such a construct is referred to herein as a latent data type annotation. An example of a latent data type annotation is based on the SQL operator "TREAT AS". The operator can be used to explicitly mark values stored in a particular column as JSON data in a rewrite of Database Statement 1 that is represented by Database Statement 2 below.

SQL>(select TREAT(col as json) col from t) select t.col.name from simple t; Database Statement 2

By annotating "col" as JSON, the dot notation can be applied in Database Statement 2 to project the attribute "name." That is, annotating a column as having a particular latent data type thereby enables a DBMS to process column values according to the notation and the particular latent data type.

Before compilation, a database statement may be written to explicitly annotate a latent data type using, for example, the "TREAT AS" operator. For example, if a programmer knows that a column or a function returns a latent data type, the programmer may write a database statement annotating the column or function as a latent data type using the "TREAT AS" operator.

For example, Database Statement 3 specifies a JSON_ARRAY operation on a column "col" in a table "t1":

SQL>select json_array(col) from t1; Database Statement 3

The JSON_ARRAY operation evaluates a list of values and returns an array containing those values. "Col" may contain the following JSON value:

{"name":"Fred"}

Because JSON is not a recognized data type, the data type for Col is defined to be a character string. Accordingly, when Database Statement 3 is executed, the result for the column may be.

["{\"name\":\"Fred\"}"]

That is, by virtue of the JSON value being treated as a character string, the output contains the value with added double-quotes around the value and a backslash preceding each original double-quote in the value.

To output a value consistent for the JSON latent data type, i.e. without added double-quotes, backslashes, or other added characters, the value may be annotated as having the latent data type. For example, in Database Statement 4, below, "col" is identified as a JSON column (i.e., a column that exclusively stores JSON data) by application of the TREAT AS operation.

SQL>select json_array(treat (col as json)) from t1; Database Statement 4

By identifying "col" as a JSON column, the following value in "col"

{"name":"Fred"} can be correctly outputted as follows:

[{"name":"Fred"}]

In Database Statement 5, below, the TREAT AS clause is used to annotate the result of a function call "foo" as JSON data. Consequently, the simplified syntax of dot notation can be applied in Database Statement 5 to project "last name". "Foo" is a function that returns data with a character string data type (e.g., a VARCHAR2).

---
Database Statement 5
---

WITH foo_result AS (
SELECT TREAT (foo(ename, dept) AS JSON) FROM emp;)
SELECT foo_result.customerInfo.lastName

---

Detection of a latent data type can involve automatically identifying any output of an operator known to output a particular latent data type as having the particular latent data type. For example, some operators are expected to return JSON data. Examples are the JSON generation functions (e.g., JSON_OBJECT) or JSON_QUERY, which returns a JSON fragment from JSON input. The output of these operators can therefore be marked implicitly as carriers of JSON data when compiling a database statement with these operators.

Moreover, outputs of expressions that have nested operators known to output a particular latent data type may also be automatically detected. For example, Database Statement 6, below, is a CASE expression that includes two nested JSON_OBJECT operators.

---
Database Statement 6
---
```
SELECT CASE revenue
    WHEN > 1000 THEN
        JSON_OBJECT('status' VALUE "gold")
    ELSE
        JSON_OBJECT('status' VALUE "silver")
    END
FROM customers;
```
---

Because all branches of the CASE expression in Database Statement 6 return JSON data, the CASE expression's output is known to be JSON data and any output can therefore be identified implicitly (i.e., automatically).

Operator Trees

A database statement may be represented by an operator tree that includes one or more operators that may operate on one or more operands. An operator tree is a tree graph having nodes as operators. An operator includes data that defines an operation, the operation's input or output, and the data type of the inputs and outputs of the operation.

Operator trees are used by DBMSs to compile database statements. Generally, an operator tree is generated for an original database statement. The database statement may be rewritten one or multiple times during compilation, with each rewrite being represented by a modified operator tree.

An execution plan for a database statement is generated based on an operator tree. The execution plan itself may be represented by an execution plan tree with execution plan operators, each execution plan operator representing an operation to execute the database statement, the inputs and the outputs of the operation, and the data types of the inputs and outputs.

Generally, an operator tree represents a query at a higher level of abstraction while a corresponding execution plan specifies more details about operations for actually executing a database statement. For example, for a join operation, an operator tree may include a join operator specifying an equijoin between two tables, the join key of each table, and the data types of the join keys. The execution plan may include an execution plan operation defining the join, and defining further details, such as the type of join technique (e.g. nested loop, hash join, sort merge) and other details about execution of the join, and additional columns to project as output of join that are not involved in the join but that may be used by other operations needed to execute the query, and data types of those columns.

FIGS. 1A-1D illustrate operator trees that correspond to Database Statements 1-4, respectively. Each of Database Statements 1-4 references a column "col" which stores the value {"name": "Fred"} as a character string.

FIG. 1A illustrates an operator tree for Database Statement 1, in which a Select operator 102 projects value t.col.name 104 from a table t 106. This database statement may result in an error if t 106 is not identified as having a format that can be referenced using the notation t.col.name 104.

Figure 1B:
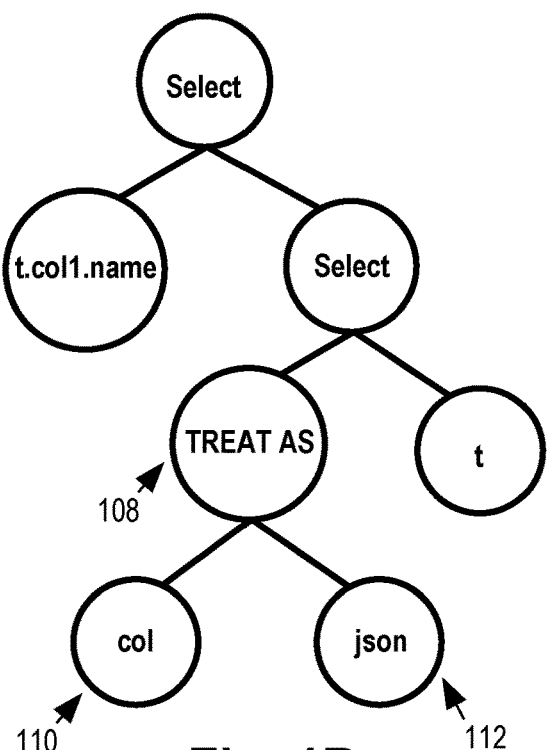
FIG. 1B illustrate operator trees that correspond to database statements, in an embodiment.

FIG. 1B illustrates an operator tree for Database Statement 2, in which a TREAT AS operator 108 identifies a column col 110 as storing data having a JSON 112 latent data type. While FIG. 1B includes a TREAT AS operator 108 having JSON 112 as an argument, the TREAT AS operator 108 could alternatively be replaced with a TREAT AS JSON operator with only a single input (col 110). The TREAT AS operator 108 identifies col 110 as storing JSON 112 data. In this way, the value t.col1.name 112 can be validly applied.

Figure 1C:
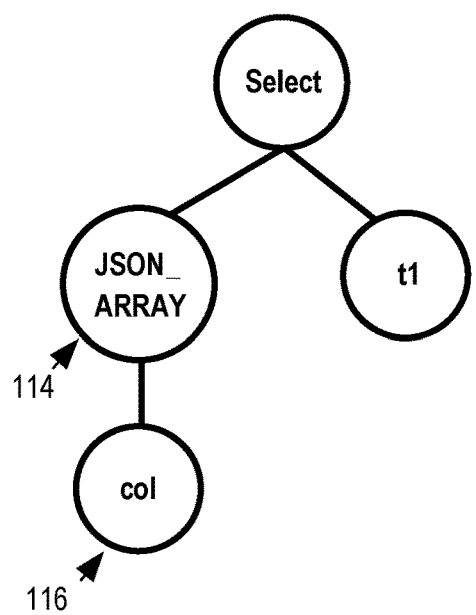
FIG. 1C illustrate operator trees that correspond to database statements, in an embodiment.

FIG. 1C illustrates an operator tree for Database Statement 3, in which a JSON_ARRAY operator 114 is applied to col 116. JSON_ARRAY 114 is an operator that returns an array of values having JSON format. However, because the value {"name": "Fred"} is stored in col 116 as a character string, it may be inherently treated as a character string. Accordingly, the value {"name": "Fred"} is returned as ["{\"name\":\"Fred\"}"] based on character string notation. In one embodiment, however, a DBMS may be configured to treat the output of the JSON_ARRAY operator 114 as a JSON latent data type. Accordingly, an internal representation of {"name": "Fred"} may have an operand flag that is set based on being output from the JSON_ARRAY operator 114. Accordingly, by virtue of the operand flag, the value {"name": "Fred"} can correctly be recognized as JSON data and returned as [{"name": "Fred"}].

Figure 1D:
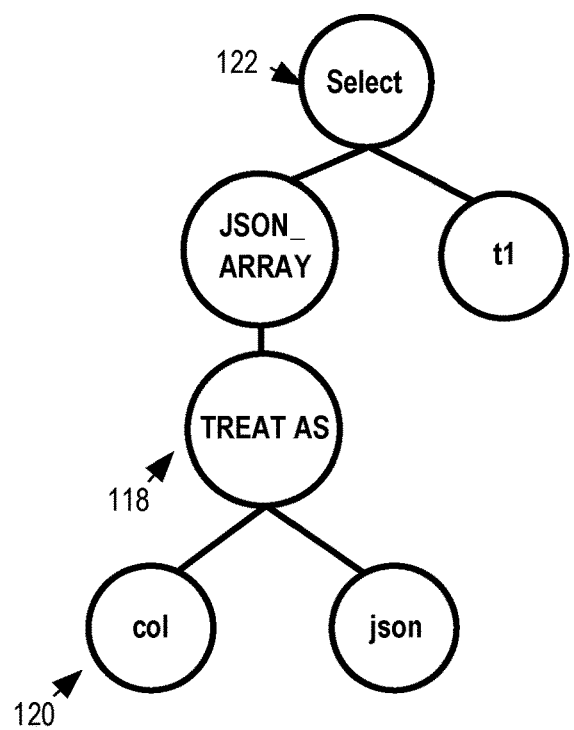
FIG. 1D illustrate operator trees that correspond to database statements, in an embodiment.

Another option is to rewrite Database Statement 3 to form a rewritten database statement as shown by the operator tree in FIG. 1D. The operator tree applies a TREAT AS operator 118 to col 120. In this way, a check constraint may be added to col 120 to indicate that col 120 stores JSON data. In an embodiment, an operand flag may be set in metadata of a SELECT list associated with the Select operation 122 to indicate JSON data based on the TREAT AS operator 118.

The operator trees illustrated in FIGS. 1A-1D are relatively simple for purposes of exposition. However, database statements can have any number of operators and operator trees based on database statements can likewise be much larger.

Setting Operand Flags

Figure 2:
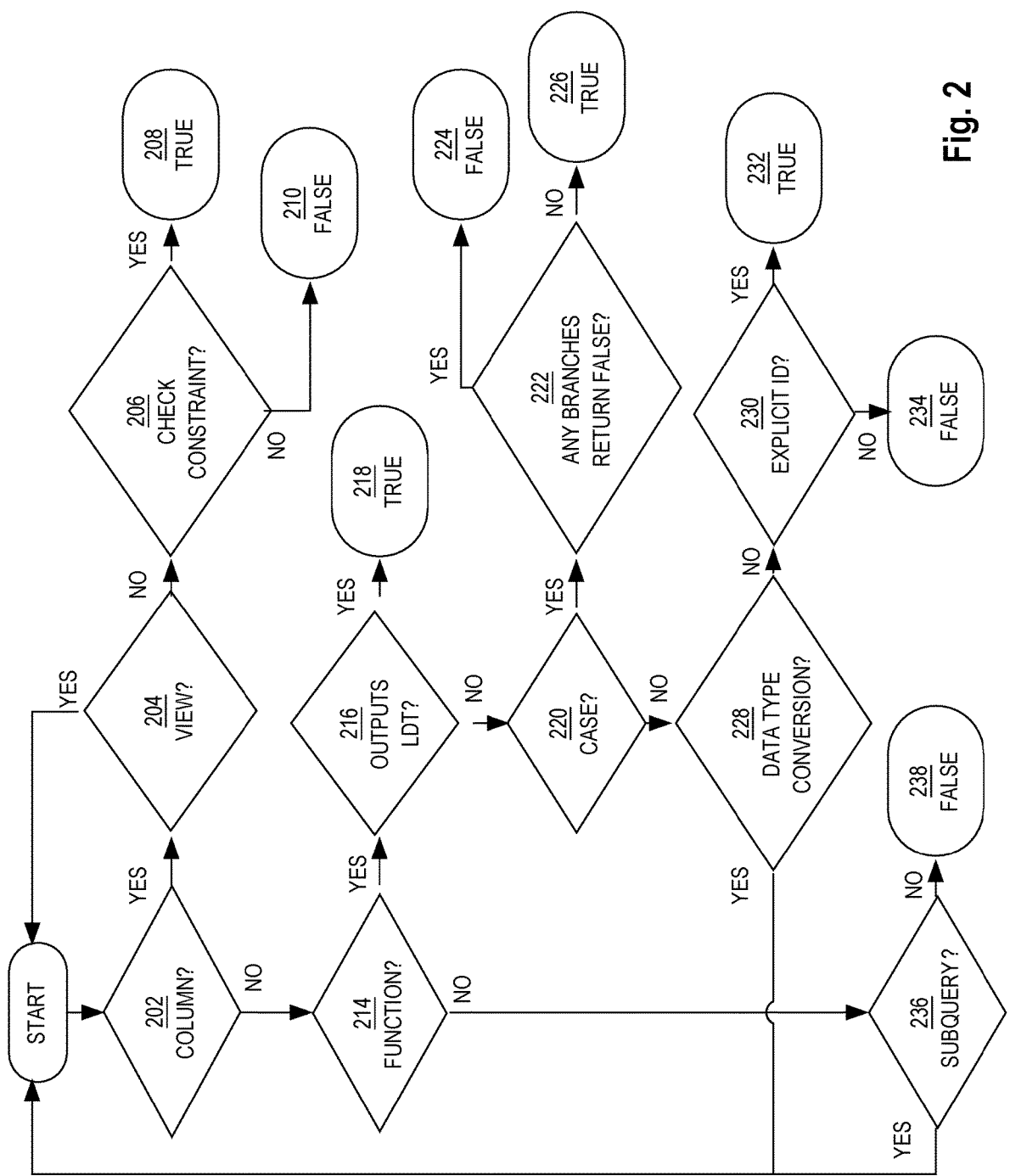
FIG. 2 depicts a flow diagram illustrating how an operand flag for each visited operand during a recursive traversal of an operator tree is set.

According to an embodiment of the present invention, an operator tree for a database statement is generated. The operator tree is recursively traversed. For each operator visited, the procedure shown in FIG. 2 is executed to determine whether an output of the operator has a latent data type. If so, then an operand flag is set to specify or otherwise indicate that the operand returns the latent data type.

The procedure shown in FIG. 2 is used to determine whether an operator returns output that has JSON as a latent data type. However, the procedure may be adapted for other data types, such as XML (eXtensible Mark-up Language).

Specifically, FIG. 2 depicts a flow diagram illustrating how an operand flag is set for each visited operator during a recursive traversal of an operator tree; when set the operand flag identifies a particular latent data type as JSON. In the below description of the flow diagram, the operator being visited is referred to as simply the operator.

At step 202, it is determined whether the output of the operator is from a column of a database table. If so, the procedure 200 proceeds to step 204. If not, the procedure 200 moves to step 214.

At step 204, it is determined whether the output of the operator is from a column of a database view. If so, the procedure 200 returns to step 202 to run the procedure 200 treating the output of the operator as if the output is from the column. If not, the procedure 200 moves to step 206.

At step 206, it is determined whether the column has a check constraint indicative of the particular latent data type.

For example, the check constraint may be an "IS_JSON" constraint associated with the column. Check constraint status may be inferred from a remote DBMS. If the column has a check constraint indicative of the particular latent data type, the procedure 200 proceeds to step 208. If not, the procedure 200 moves to step 210.

At step 208, a value of TRUE is returned and the operand flag for the given operand is set.

At step 210, a value of FALSE is returned and the operand flag for the given operand is not set.

At step 214, it is determined whether the output of the operator is the output of a function. If so, the procedure 200 continues to step 216. If not, the procedure 200 moves to step 236.

At step 216, it is determined if the function is a function known to output the particular latent data type. For example, the functions OPTJSONOBJECT, OPTJSONOBJECTAGG, OPTJSONARRAYAGG, and OPTJSONQUERY are known to output JSON data. In an embodiment, a DBMS may be hard coded to recognize particular latent data types. If the function is known to output the particular latent data type, the procedure 200 continues to step 218. If not, the procedure 200 continues to step 220.

At step 218, a value of TRUE is returned and the operand flag of the operator is set.

At step 220, it is determined if the function is a case function. If so, the procedure 200 continues to step 222. If not, the procedure 200 moves to step 228.

At step 222, it is determined if at least one branch of the case function provides an output having a different type than the particular latent data type. In an embodiment, this determination may be made by using the output of each branch of the case function as the output of the operator of the procedure 200 described herein. If at least one branch of the case function provides an output having a different type than the particular latent data type, the procedure 200 continues to step 224. If every branch provides an output having the particular latent data type, the procedure 200 continues to step 226.

At step 224, a value of FALSE is returned and the operand flag of the operator is not set.

At step 226, a value of TRUE is returned and the operand flag of the operator is set.

At step 228, it is determined if the function is a data type conversion converting data to a target data type. If so, the procedure 200 returns to step 202 using the target data type as the data type of the output of the operator. If not, the procedure 200 moves to step 230.

At step 230, it is determined if the function is a particular latent data type annotation. For example, the function may be a TREAT AS operator that identifies a value as JSON or another latent data type. If it is determined that the function is an operator that explicitly identifies the output as the particular latent data type, the procedure 200 continues to step 232. If not, the procedure 200 moves to step 234.

At step 232, a value of TRUE is returned and the operand flag of the operator is set.

At step 234, a value of FALSE is returned and the operand flag of the operator is not set.

At step 236, it is determined whether the output of the operator is from a subquery. If so, the procedure 200 returns to step 202 using the output of the subquery as the operator. If not, the procedure 200 moves to step 238.

At step 238, a value of FALSE is returned and the operand flag of the operator is not set.

Once an operator tree is annotated or otherwise marked for latent data types by setting operand flags, the execution plan may be generated according to the operand flags. For example, the operator 104 in FIG. 1A is marked as returning the latent data type JSON. The corresponding execution plan operator for the operator 104 is configured to project the JSON attribute name for t.col.

Processing Database Statements

A database statement, which may represent a query, is an expression, command, or set of commands that, when executed, causes a database server to perform one or more operations on a set of data. The term "table" refers to any source object that is referenced or defined by a query and that represents a set of rows, such as a database table, view, or an inline query block, such as an inline view or subquery.

A database statement may be executed to access values stored in database columns. An executed database statement may reference a column and/or values within the column using a specific notation or operation. Certain operations may be valid for certain data types and invalid for others. For example, referencing a column using dot notation is invalid for use on character strings. However, by setting an operand flag of a value as described herein, searching using dot notation may be performed on otherwise invalid data types. For example, referencing using dot notation is a valid operation for JSON data. Because dot notation specifies a property that is valid for JSON data, performing an operation that is based on dot notation is valid if the JSON latent data type is indicated.

Operand Flags in Operator Trees

An operand flag may be set at various stages of processing operator trees. In some cases, an operand flag may be reset or lost due to operations that occur after an operand flag is set.

Figure 3:
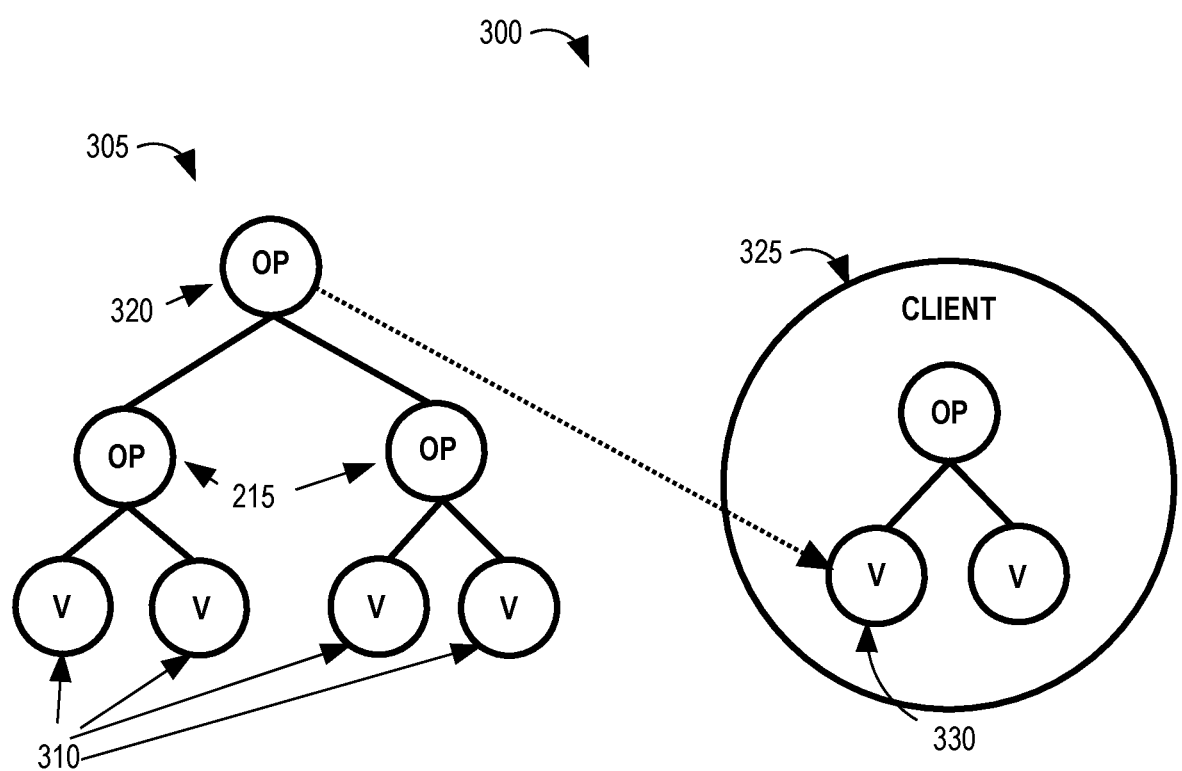
FIG. 3 illustrates an operator tree in which an operand flag may be set, in an embodiment.

FIG. 3 illustrates an operator tree in which an operand flag may be set. A first operator tree 305 has multiple leaf values 310. One or more of the leaf values 310 may include an operand flag indicating a particular latent data type. The operand flag may be automatically set as described in FIG. 2 based on the source of the value.

The leaf values 310 may be inputted to operators 315 that receive data inputs and output an output value. In an embodiment, one or more operators 315 may be a TREAT AS or similar operator that may be used to explicitly set an operand flag in of a value to indicate a particular latent data type. Another operator 315 may be a JSONQUERY or other operator that may cause an operand flag to be set because it is known that such operators output data having a particular latent data type. One or more operators 315 may remove operand flags. For example, a SUBSTR operation removes a portion of a value, which may include an operand flag of the value. Thus, in some cases a previously set operand flag may be lost when a root operator 320 is reached. In such cases, the operand flag may not be included in a value sent to a client 325. The client 325 may be any system that is external to a database instance running the first expression tree 305.

In other cases, the client 325 may be a remote database server and may receive a value that includes an operand flag that has been set or is unset. The client 325 may receive the value as a leaf node of a client-side operator tree 330. The client 325 may access a database dictionary to accurately determine the meaning of the operand flag.

A SELECT operation may specify one or more columns from which to retrieve values. The one or more columns may be referred to herein as a "SELECT list." A compile query uses a type-checking system to go through the base column tables and views all the way up to each SELECT list. Thus, when an operand flag is set in metadata of the SELECT list, the information that a value has a particular latent data type is carried to the SELECT list. A client can then look at the SELECT list metadata to determine whether the value is the particular latent data type. Any database statement would therefore have access to the latent data type information.

Additionally, dictionary views may be created that describe any functions, columns, or other data output sources that return values having a particular latent data type. In this way, the dictionary view can be accessed to determine if an operand flag should be automatically set based on any particular data source. Multiple database instances may store dictionary views such that data received from an external database instance can be accurately evaluated to determine the presence of a latent data type in the data.

Advantages Over Other Techniques

Setting operand flags as described herein, either explicitly or implicitly, allows for improved performance without excessive run-time overhead. An operand flag may be set in compile-time metadata, such as an operator tree. By setting an operand flag, additional functionalities that are available to a latent data type but not a recognized data type can be executed. These additional functionalities are provided without having to convert the data formatted for a recognized data type to data for the latent data type, as occurs for type recasting. Instead, during compile time, execution operators that are configured to handle the latent data types are incorporated into execution plans generated for database statement.

Figure 4:
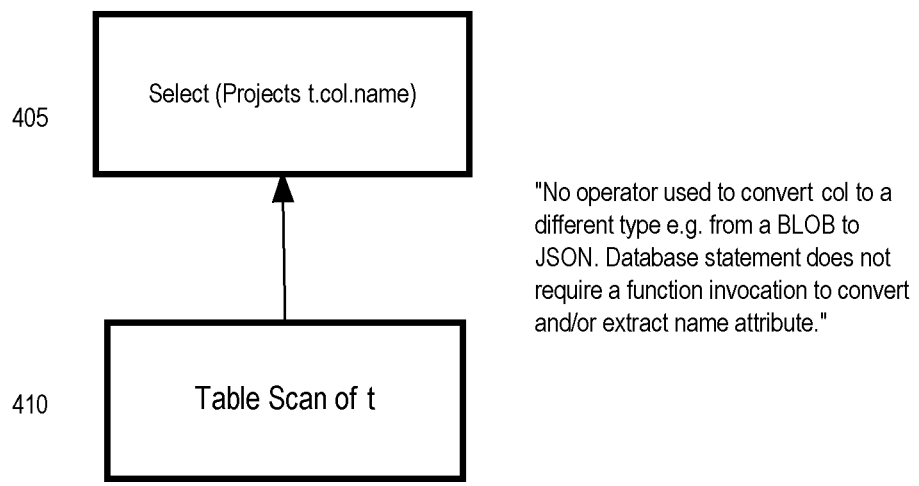
FIG. 4 depicts an execution plan for executing a database statement according to an embodiment.

For example, FIG. 4 depicts an execution plan for executing Database statement 2. Referring to FIG. 4, execution plan 401 includes execution plan operators 405 and 410. Execution plan operator 410 is a table scan operator that returns rows from table "t" and the columns of the table "t" projected by Database statement 2.

Execution plan operator 405 is a select operator that has been specifically configured to project "name" of column "col", thereby treating "col" as a JSON data type. Execution plan 401 includes no conversion execution operator corresponding to the TREAT AS clause to convert column values from recognized type of "col" to the latent data type JSON. Rather, execution plan 405 receives values in col "col" as a recognized type and projects "name". Thus the overhead of performing such conversion and/or of executing another operator, is avoided.

The embodiments described herein also provide improved performance by avoiding unnecessary string parsing. For example, a first operator, JSON_QUERY, may be known to output the JSON latent data type. A second operator, JSON_OBJECT, may output values having data types that are based on the input data type (i.e., the outputs of JSON_OBJECT are not always JSON). An output value of the JSON_QUERY operators may be used as input to the JSON_OBJECT operator. Because JSON_QUERY is an operator known to output the JSON latent data type, the output value of the JSON_QUERY operator is known to have the JSON latent data type. Because the JSON_OBJECT operator outputs varying data types, output values of the JSON_OBJECT operator must conventionally be parsed to determine the output data type. However, because the output value of the JSON_QUERY operator (which is known to be JSON) is used as input to the JSON_OBJECT operator, the output of the JSON_OBJECT operator may be known to be JSON without the need to spend time and resources to parse the output value.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e. one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

JSON

JSON is described herein as being an example of a latent data type. JSON is a lightweight hierarchical mark-up language. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "{ }" and separated within the braces by commas.

An array, which is a list of comma separated JSON values enclosed in square brackets "[ ]".

An atom, which is a string, number, true, false, or null.

The following JSON object J is used to illustrate JSON.

```
{
    "FIRSTNAME": "JACK",
    "LASTNAME": "SMITH",
    "ADDRESS": {
        "STREETADDRESS": "101 FIRST STREET",
        "CITY": "SAN JOSE",
        "STATE": "CA",
        "POSTALCODE": "95110"
    },
    "PHONENUMBERS": [
        "408 555-1234",
        "650 123-5555"
    ]
}
```

Object J contains fields FIRSTNAME, LASTNAME, ADDRESS, STREETADDRESS, CITY, STATE, POSTALCODE, and PHONENUMBERS. FIRSTNAME and LASTNAME have atom string values "JOHN" and "SMITH", respectively. ADDRESS is an object containing member fields STREETADDRESS, CITY, STATE, and POSTALCODE, which have atom string values "101 FIRST STREET", "SAN JOSE", "CA", "95110", respectively. PHONENUMBERS is an array comprising atom values "408 555-1234" and "650 123-5555".

JSON is described in further detail in U.S. patent application Ser. No. 14/699,685, entitled "Dynamically Updating Data Guide For Hierarchical Data Objects", filed on Apr. 29, 2015 by Zhen Hua Liu, Beda Christoph Hammerschmidt, Ying Lu, Rahul Manohar Kadwe, Douglas McMahon, the entire contents of which are incorporated by reference. The application also describes XML, which may be a patent data type in an embodiment of the present invention.

Software Overview

Figure 5:
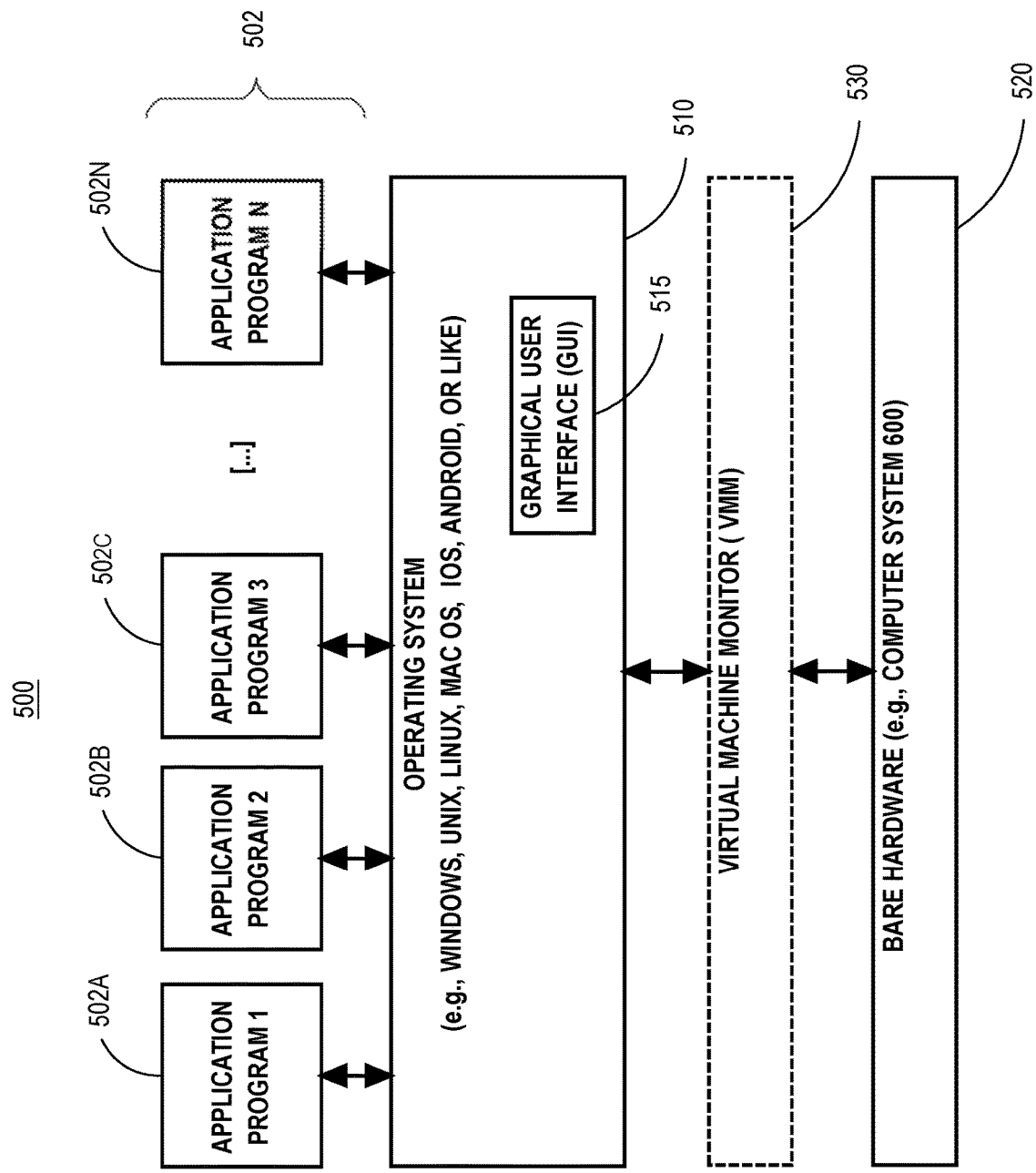
FIG. 5 depicts basic software system that may be employed for controlling the operation of computing system 500.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   a database management system (DBMS) compiling a database statement, wherein the DBMS compiling comprises:
   determining that an expression in said database statement indicates a latent data type, said expression having a recognized data type defined by the DBMS;
   in response to determining that said expression in said database statement indicates said latent data type, generating an execution plan that treats said expression as said latent data type instead of said recognized data type;
   wherein generating said execution plan that treats said expression as said latent data type instead of said recognized data type includes generating an execution plan that includes an execution plan operator that receives a column as said recognized data type and performs an operation on the column based on the latent data type;
   executing said execution plan.

2. The method of claim 1, wherein determining that said expression in said database statement indicates said latent data type includes determining that a column referenced by said database statement is defined by said DBMS to be constrained to the latent data type, wherein said recognized data type is defined for said column said DBMS.

3. The method of claim 1, wherein determining that said expression in said database statement indicates said latent data type includes determining that a column referenced by said database statement is referenced as an operand in a function, wherein said function expects said operand to have said latent data type.

4. The method of claim 1, wherein determining that said expression in said database statement indicates said latent data type includes determining that a function referenced by said database statement returns data having said latent data type.

5. The method of claim 1, wherein determining that said expression in said database statement indicates said latent data type includes determining that all branches of a case statement return said latent data type.

6. The method of claim 1, wherein determining that said expression in said database statement indicates said latent data type includes determining that a function referenced by said database statement converts data to said latent data type.

7. The method of claim 1, wherein determining that said expression in said database statement indicates said latent data type includes determining that a TREAT AS clause specifies said latent data type.

8. The method of claim 1, further including:
   in response to determining that said expression in said database statement indicates a latent data type, rewriting said database statement to include a TREAT AS clause that identifies said latent type, wherein generating said execution plan includes generating said execution plan that treats said expression as said latent data type based on said rewriting said database statement.

9. The method of claim 1, further comprising determining that said expression in said database statement indicates said latent data type by using a DBMS Application Programming Interface (API).

10. One or more non-transitory computer-readable media storing sequences of one or more instructions which, when executed by one or more processors, cause:
   a database management system (DBMS) compiling a database statement, wherein the DBMS compiling comprises:
   determining that an expression in said database statement indicates a latent data type, said expression having a recognized data type defined by the DBMS;
   in response to determining that said expression in said database statement indicates said latent data type, generating an execution plan that treats said expression as said latent data type instead of said recognized data type;
   wherein generating said execution plan that treats said expression as said latent data type instead of said recognized data type includes generating an execution plan that includes an execution plan operator that receives a column as said recognized data type and performs an operation on the column based on the latent data type;
   executing said execution plan.

11. The one or more non-transitory computer-readable media of claim 10, wherein determining that said expression in said database statement indicates said latent data type includes determining that a column referenced by said database statement is defined by said DBMS to be constrained to the latent data type, wherein said recognized data type is defined for said column said DBMS.

12. The one or more non-transitory computer-readable media of claim 10, wherein determining that said expression in said database statement indicates said latent data type includes determining that a column referenced by said database statement is referenced as an operand in a function, wherein said function expects said operand to have said latent data type.

13. The one or more non-transitory computer-readable media of claim 10, wherein determining that said expression in said database statement indicates said latent data type includes determining that a function referenced by said database statement returns data having said latent data type.

14. The one or more non-transitory computer-readable media of claim 10, wherein determining that said expression in said database statement indicates said latent data type includes determining that all branches of a case statement return said latent data type.

15. The one or more non-transitory computer-readable media of claim 10, wherein determining that said expression in said database statement indicates said latent data type includes determining that a function referenced by said database statement converts data to said latent data type.

16. The one or more non-transitory computer-readable media of claim 10, wherein determining that said expression in said database statement indicates said latent data type includes determining that a TREAT AS clause specifies said latent data type.

17. The one or more non-transitory computer-readable media of claim 10, the sequences of one or more instructions further including instructions that, when executed by said one or more processors, cause:
  in response to determining that said expression in said database statement indicates a latent data type, rewriting said database statement to include a TREAT AS clause that identifies said latent type, wherein generating said execution plan includes generating said execution plan that treats said expression as said latent data type based on said rewriting said database statement.

18. The one or more non-transitory computer-readable media of claim 10, the sequences of one or more instructions further including instructions that, when executed by said one or more processors, cause determining that said expression in said database statement indicates said latent data type by using a DBMS Application Programming Interface (API).

19. The method of claim 1, wherein said latent data type and said recognized data types have different data types.

20. The one or more non-transitory computer-readable media of claim 10, wherein said latent data type and said recognized data types have different data types.

* * * * *

UNITED STATES PATENT AND TRADEMARK OFFICE
CERTIFICATE OF CORRECTION

PATENT NO. : 11,409,741 B2
APPLICATION NO. : 15/993438
DATED : August 9, 2022
INVENTOR(S) : Hammerschmidt et al.

Page 1 of 1

It is certified that error appears in the above-identified patent and that said Letters Patent is hereby corrected as shown below:

In the Claims

In Column 18, Line 4, in Claim 1, before "executing" insert -- said DBMS --, therefor.

In Column 18, Line 38, in Claim 8, after "latent" insert -- data --, therefor.

In Column 18, Line 67, in Claim 10, before "executing" insert -- said DBMS --, therefor.

In Column 20, Line 13, in Claim 17, after "latent" insert -- data --, therefor.

Signed and Sealed this
Third Day of January, 2023

Katherine Kelly Vidal
*Director of the United States Patent and Trademark Office*